(12) United States Patent
Fletcher et al.

(10) Patent No.: US 7,172,114 B2
(45) Date of Patent: Feb. 6, 2007

(54) TAMPERPROOF POINT OF SALE TRANSACTION TERMINAL

(75) Inventors: Donna M. Fletcher, Auburn, NY (US); Melvin D. McCall, Homer, NY (US); Timothy R. Fitch, Syracuse, NY (US); Gerard Beckhusen, Liverpool, NY (US)

(73) Assignee: Hand Held Products, Inc., Skaneateles Fall, NY (US)

( * ) Notice: Subject to any disclaimer, the term of this patent is extended or adjusted under 35 U.S.C. 154(b) by 0 days.

(21) Appl. No.: 11/027,239

(22) Filed: Dec. 30, 2004

(65) Prior Publication Data

US 2006/0144934 A1 Jul. 6, 2006

(51) Int. Cl.
*G06K 5/00* (2006.01)

(52) U.S. Cl. ............ 235/380; 235/379; 235/381; 705/64; 705/68

(58) Field of Classification Search ........ 235/383, 235/386, 379, 380, 381; 705/9, 12, 64, 68; 361/680, 681
See application file for complete search history.

(56) References Cited

U.S. PATENT DOCUMENTS

| | | |
|---|---|---|
| 3,596,389 A | 8/1971 | Drueck, Jr. |
| 3,954,244 A | 5/1976 | Gopstein |
| 4,017,129 A | 4/1977 | Boldt et al. |
| 4,126,768 A | 11/1978 | Grenzow |
| 4,141,078 A | 2/1979 | Bridges, Jr. et al. |
| 4,313,035 A | 1/1982 | Jordan et al. |
| 4,403,700 A | 9/1983 | Manlove |
| 4,432,020 A | 2/1984 | Onose et al. |
| 4,471,165 A | 9/1984 | DeFino et al. |
| 4,524,396 A | 6/1985 | Schulz et al. |
| 4,534,562 A | 8/1985 | Cuff et al. |
| 4,630,201 A | 12/1986 | White |
| 4,658,416 A | 4/1987 | Tanaka |
| 4,680,801 A | 7/1987 | Etherington et al. |

(Continued)

FOREIGN PATENT DOCUMENTS

WO  WO 96/26505  8/1996

(Continued)

OTHER PUBLICATIONS

U.S. Appl. No. 10/414,385, filed Apr. 15, 2003, Fitch et al.

(Continued)

*Primary Examiner*—Jared J. Fureman
*Assistant Examiner*—Allyson N Trail
(74) *Attorney, Agent, or Firm*—Wall, Marjama & Bilinski LLP

(57) ABSTRACT

A point of sale transaction terminal that has a signature capture pad mounted within a platen that is recessed within the top surface of the terminal housing. A screen protector is mounted over the signature pad and is registered thereon so that the protector covers the signature pad. A bezel is mounted upon said platen within the recess of the housing so that the bezel surrounds the periphery of the protector and the capture pad. A latching mechanism is located beneath the bezel which serves to removably secure the bezel to the platen. An access port is provided in said housing that allows restricted access to the latching mechanism for unlatching the bezel.

40 Claims, 2 Drawing Sheets

U.S. PATENT DOCUMENTS

| | | | |
|---|---|---|---|
| 4,689,478 A | 8/1987 | Hale et al. |
| 4,689,742 A | 8/1987 | Troy et al. |
| 4,711,996 A | 12/1987 | Drexler |
| 4,747,050 A | 5/1988 | Brachtl et al. |
| 4,775,784 A | 10/1988 | Stark |
| 4,783,823 A | 11/1988 | Tasaki et al. |
| 4,791,278 A | 12/1988 | Hudson et al. |
| 4,839,781 A | 6/1989 | Barnes et al. |
| 4,858,121 A | 8/1989 | Barber et al. |
| 4,870,503 A | 9/1989 | Miura |
| 4,897,865 A | 1/1990 | Canuel |
| 4,902,079 A | 2/1990 | Kaplan et al. |
| 4,920,567 A | 4/1990 | Malek |
| 4,943,868 A | 7/1990 | Yoshinaga et al. |
| 5,001,612 A | 3/1991 | Odium |
| 5,055,660 A | 10/1991 | Bertagna et al. |
| 5,109,426 A | 4/1992 | Parks |
| 5,115,888 A | 5/1992 | Schneider |
| 5,216,517 A | 6/1993 | Kinoshita et al. |
| 5,258,604 A | 11/1993 | Behrens et al. |
| 5,297,202 A | 3/1994 | Kapp et al. |
| 5,311,175 A | 5/1994 | Waldman |
| 5,317,136 A | 5/1994 | Hasegawa et al. |
| 5,324,922 A | 6/1994 | Roberts |
| 5,334,821 A | 8/1994 | Campo et al. |
| 5,347,589 A | 9/1994 | Meeks et al. |
| 5,353,331 A | 10/1994 | Emery et al. |
| 5,357,563 A | 10/1994 | Hamilton et al. |
| 5,362,053 A | 11/1994 | Miller |
| 5,386,104 A | 1/1995 | Sime |
| 5,406,619 A | 4/1995 | Akhteruzzaman et al. |
| 5,448,044 A | 9/1995 | Price et al. |
| 5,455,861 A | 10/1995 | Faucher et al. |
| 5,467,403 A | 11/1995 | Fishbine et al. |
| 5,479,530 A | 12/1995 | Nair et al. |
| 5,509,083 A | 4/1996 | Abtahi et al. |
| 5,521,966 A | 5/1996 | Friedes et al. |
| 5,539,159 A | 7/1996 | Protheroe et al. |
| 5,559,885 A | 9/1996 | Drexler et al. |
| 5,561,282 A | 10/1996 | Price et al. |
| 5,568,357 A | 10/1996 | Kochis et al. |
| 5,577,118 A | 11/1996 | Sasaki et al. |
| 5,581,607 A | 12/1996 | Richardson, Jr. et al. |
| 5,586,166 A | 12/1996 | Turban |
| 5,625,534 A | 4/1997 | Okaya et al. |
| 5,638,457 A | 6/1997 | Deaton et al. |
| 5,640,002 A | 6/1997 | Ruppert et al. |
| 5,652,806 A | 7/1997 | Friend |
| 5,657,389 A | 8/1997 | Houvener |
| 5,659,431 A | 8/1997 | Ackley |
| 5,661,297 A | 8/1997 | Aleshire et al. |
| 5,672,850 A | 9/1997 | Miller et al. |
| 5,679,943 A | 10/1997 | Schultz et al. |
| 5,696,909 A | 12/1997 | Wallner |
| 5,703,349 A | 12/1997 | Meyerson et al. |
| 5,714,745 A | 2/1998 | Ju et al. |
| 5,717,195 A | 2/1998 | Feng et al. |
| 5,740,232 A | 4/1998 | Pailles et al. |
| 5,745,705 A | 4/1998 | Iguchi |
| 5,805,416 A | 9/1998 | Friend et al. |
| 5,805,807 A | 9/1998 | Hanson et al. |
| 5,818,023 A | 10/1998 | Meyerson et al. |
| 5,845,256 A | 12/1998 | Pescitelli et al. |
| 5,852,288 A | 12/1998 | Nakazawa et al. |
| 5,864,125 A | 1/1999 | Szabo |
| 5,878,124 A | 3/1999 | Griesmer et al. |
| 5,892,824 A | 4/1999 | Beatson et al. |
| 5,895,902 A | 4/1999 | Ziarno |
| 5,923,735 A | 7/1999 | Swartz et al. |
| 5,926,549 A | 7/1999 | Pinkas |
| 5,933,812 A | 8/1999 | Meyer et al. |
| 5,936,220 A | 8/1999 | Hoshino et al. |
| 5,945,975 A | 8/1999 | Lundrigan et al. |
| 5,949,043 A | 9/1999 | Hayashida |
| 5,949,378 A | 9/1999 | Coveley |
| 5,959,281 A | 9/1999 | Domiteaux |
| 5,969,324 A | 10/1999 | Reber |
| 5,970,146 A | 10/1999 | McCall et al. |
| 5,979,764 A | 11/1999 | Swyst et al. |
| 6,003,008 A | 12/1999 | Postrel et al. |
| 6,003,762 A | 12/1999 | Hayashida |
| 6,004,003 A | 12/1999 | Dalton et al. |
| 6,019,286 A | 2/2000 | Li et al. |
| 6,064,751 A | 5/2000 | Smithies et al. |
| 6,065,679 A | 5/2000 | Levie et al. |
| 6,073,034 A | 6/2000 | Jacobsen et al. |
| 6,076,731 A | 6/2000 | Terrell |
| 6,078,848 A | 6/2000 | Bernstein et al. |
| 6,097,606 A | 8/2000 | Groves et al. |
| 6,101,483 A | 8/2000 | Petrovich et al. |
| 6,102,290 A | 8/2000 | Swartz et al. |
| 6,112,857 A | 9/2000 | Morrison |
| 6,118,889 A | 9/2000 | Izuno et al. |
| 6,139,152 A | 10/2000 | Ghahramani |
| 6,142,369 A | 11/2000 | Jonstromer |
| 6,149,055 A | 11/2000 | Gatto |
| 6,155,489 A | 12/2000 | Collins, Jr. et al. |
| 6,179,206 B1 | 1/2001 | Matsumori |
| 6,193,152 B1 | 2/2001 | Fernando et al. |
| 6,199,753 B1 | 3/2001 | Tracy et al. |
| 6,230,970 B1 | 5/2001 | Walsh et al. |
| 6,234,389 B1 | 5/2001 | Valliani et al. |
| 6,243,447 B1 | 6/2001 | Swartz et al. |
| 6,246,995 B1 | 6/2001 | Walter et al. |
| 6,247,645 B1 | 6/2001 | Harris et al. |
| 6,253,998 B1 | 7/2001 | Ziarno |
| 6,257,487 B1 | 7/2001 | Hayashida |
| 6,268,788 B1 | 7/2001 | Gray |
| 6,272,506 B1 | 8/2001 | Bell |
| 6,279,825 B1 | 8/2001 | Yokoyama |
| 6,308,893 B1 | 10/2001 | Waxelbaum et al. |
| 6,311,165 B1 | 10/2001 | Coutts et al. |
| 6,311,896 B1 | 11/2001 | Mulla et al. |
| 6,321,981 B1 | 11/2001 | Ray et al. |
| 6,327,575 B1 | 12/2001 | Katz |
| 6,330,973 B1 | 12/2001 | Bridgelall et al. |
| 6,336,900 B1 | 1/2002 | Alleckson et al. |
| 6,340,115 B1 | 1/2002 | Swartz |
| 6,357,662 B1 | 3/2002 | Helton et al. |
| 6,359,603 B1 | 3/2002 | Zwern |
| 6,384,743 B1 | 5/2002 | Vanderheiden |
| 6,400,836 B2 | 6/2002 | Senior |
| 6,415,982 B2 | 7/2002 | Bridgelall et al. |
| 6,424,949 B1 | 7/2002 | Deaton et al. |
| 6,431,444 B1 | 8/2002 | Gatto |
| 6,435,412 B2 | 8/2002 | Tsi et al. |
| 6,439,345 B1 | 8/2002 | Recktenwald et al. |
| 6,460,069 B1 | 10/2002 | Berlin et al. |
| 6,464,135 B1 | 10/2002 | Cohen et al. |
| 6,471,125 B1 | 10/2002 | Addy |
| 6,474,550 B1 | 11/2002 | Caridas |
| 6,486,862 B1 | 11/2002 | Jacobsen et al. |
| 6,492,978 B1 | 12/2002 | Selig et al. |
| 6,501,394 B1 | 12/2002 | Hamilton et al. |
| 6,512,840 B1 | 1/2003 | Tognazzini |
| 6,532,152 B1 | 3/2003 | White et al. |
| 6,539,363 B1 | 3/2003 | Allgeier et al. |
| 6,550,683 B1 | 4/2003 | Augustine |
| 6,554,705 B1 | 4/2003 | Cumbers |
| 6,557,754 B2 | 5/2003 | Gray et al. |
| 6,572,012 B1 | 6/2003 | Gannon et al. |
| 6,646,864 B2 * | 11/2003 | Richardson ............ 361/681 |
| 2001/0020640 A1 | 9/2001 | Yokochi |
| 2001/0042005 A1 * | 11/2001 | McClure et al. ............ 705/12 |

| | | | |
|---|---|---|---|
| 2002/0140714 A1 | 10/2002 | Hoffman | |
| 2003/0012012 A1* | 1/2003 | Hong | 362/85 |
| 2003/0132292 A1 | 7/2003 | Gomez et al. | |
| 2003/0132293 A1 | 7/2003 | Fitch et al. | |
| 2003/0132294 A1 | 7/2003 | Gomez et al. | |
| 2003/0132297 A1 | 7/2003 | McCall et al. | |
| 2003/0132918 A1 | 7/2003 | Fitch et al. | |
| 2003/0135751 A1 | 7/2003 | O'Donnell et al. | |
| 2003/0222135 A1* | 12/2003 | Stoutenburg et al. | 235/379 |
| 2003/0223185 A1* | 12/2003 | Doczy et al. | 361/680 |
| 2003/0229793 A1 | 12/2003 | McCall et al. | |
| 2004/0019513 A1* | 1/2004 | Colalancia et al. | 705/9 |
| 2004/0238632 A1* | 12/2004 | Homewood et al. | 235/386 |

FOREIGN PATENT DOCUMENTS

| | | |
|---|---|---|
| WO | WO 98/10368 | 3/1998 |
| WO | WO 98/14917 | 4/1998 |
| WO | WO 98/19435 | 5/1998 |
| WO | WO 98/50876 | 11/1998 |
| WO | WO 99/60533 | 11/1999 |
| WO | WO 00/04487 | 1/2000 |
| WO | WO 00/36545 | 6/2000 |
| WO | WO 00/70585 | 11/2000 |
| WO | WO 01/37229 | 5/2001 |
| WO | WO 01/61657 | 8/2001 |
| WO | WO 01/84771 | 11/2001 |

OTHER PUBLICATIONS

U.S. Appl. No. 10/841,957, filed May 7, 2004, O'Donnell et al.
Gosnell, David. Deadlines Loom for Debit Security Credit Card Management. Dec. 2002, vol. 15, Iss. 10, p. 46.
Britt, Phillip. Why Security Encryption Matters to Your Bank Community Banker, Aug. 2002; p. 18.
California Assembly Bill, AB2312, Point-of-Sale Devices, Feb. 19, 2004.

* cited by examiner

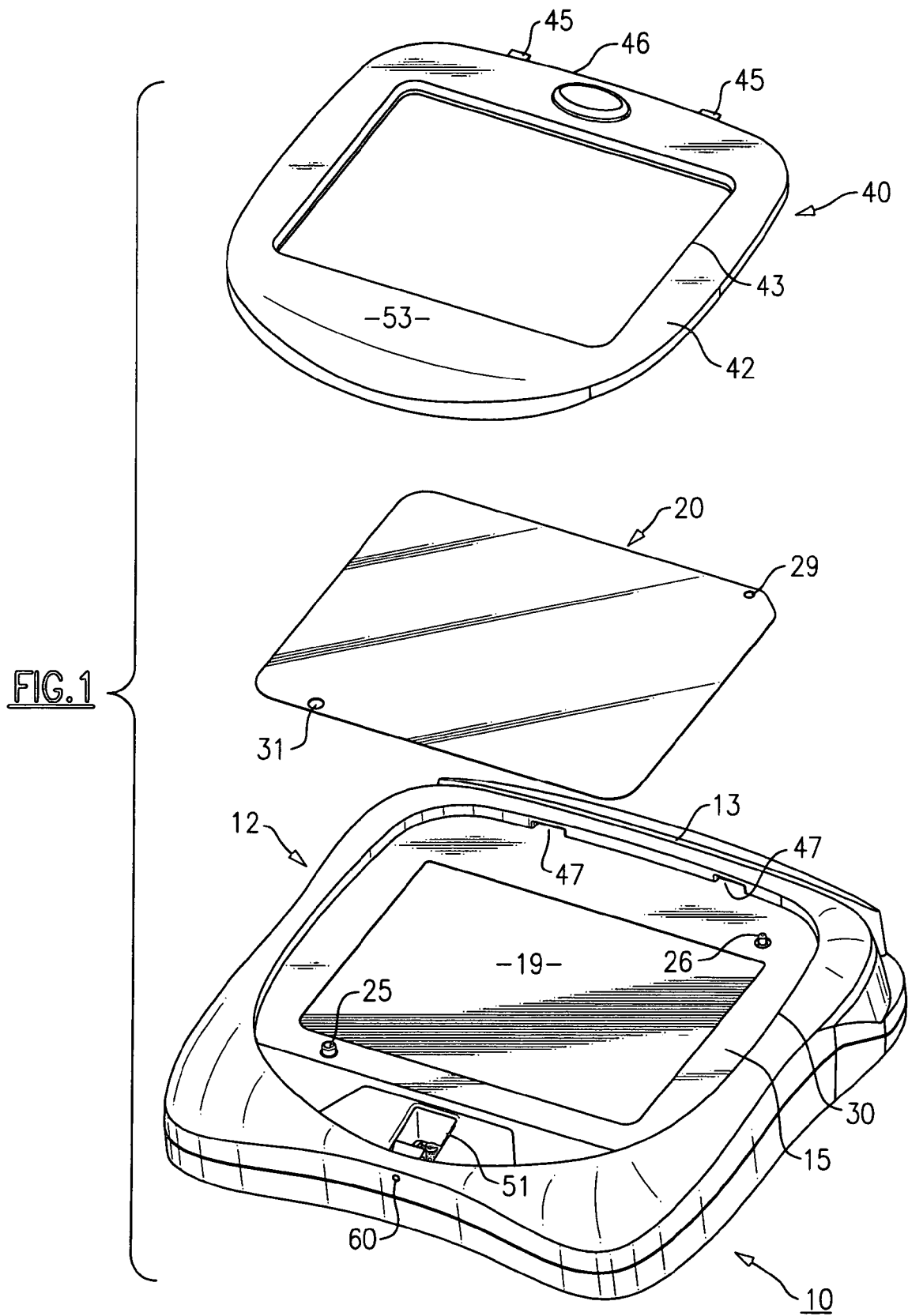

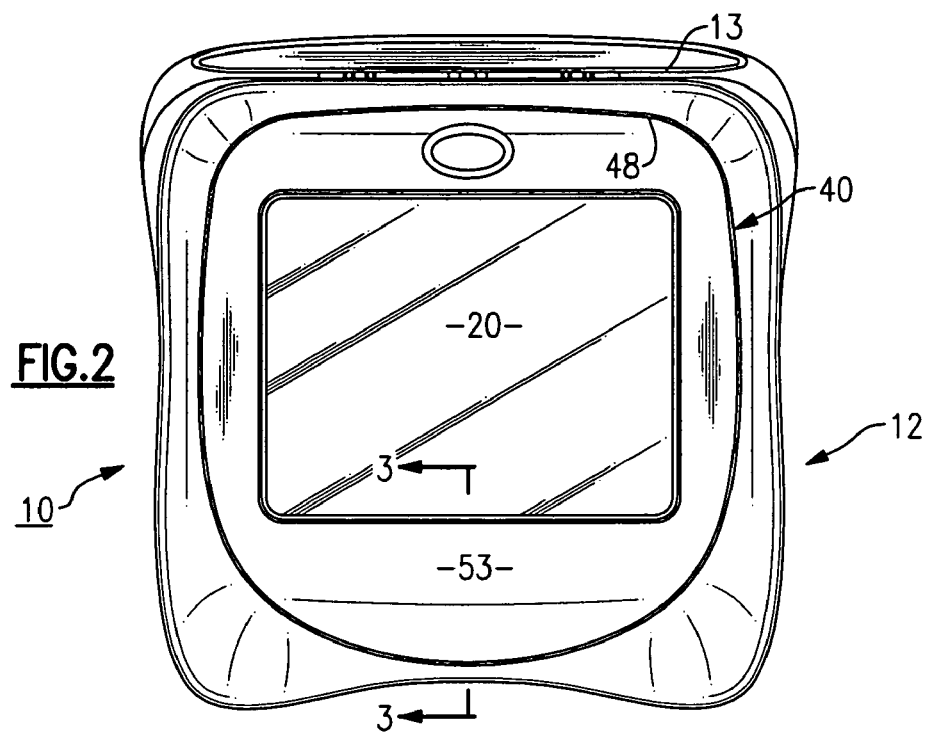
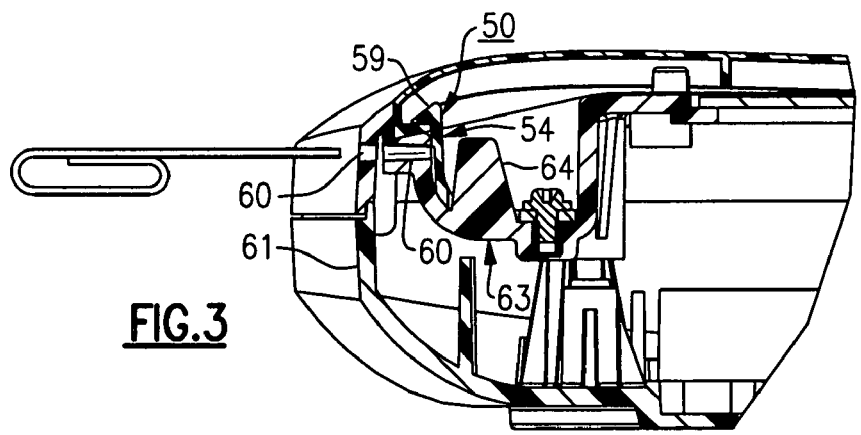
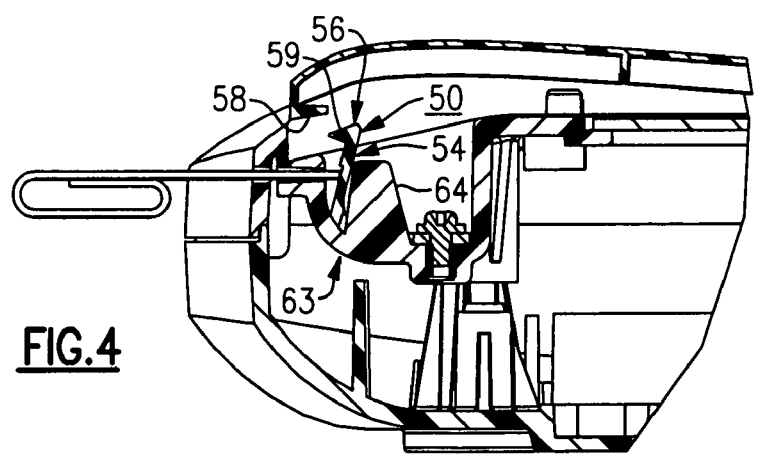

TAMPERPROOF POINT OF SALE TRANSACTION TERMINAL

FIELD OF THE INVENTION

This invention relates generally to a point of sale terminal that contains a signature capture pad.

BACKGROUND OF THE INVENTION

Transaction terminals are in use today at the point of sale in large and small retail stores, restaurants, and the like. Most of the terminals have a card reading capability for acquiring both debit and credit card data. Typically, the card is drawn through a slot in the terminal and the card related data is applied to a microprocessor which identifies the card owner, processes the necessary data to complete the transaction and generates a sale slip. As part of the transaction, the card user is asked to sign his or her name upon a signature capture pad and the signature is electronically recorded as part of the transaction.

The capture pad employed in many point of sale transaction terminals typically includes a glass substrate that is separated from a deformable polyester cover by relatively small non-conductive spheres. The opposing surfaces of the substrate and the cover sheet are coated with a conductive material. The coated surfaces are, in turn, connected to lead lines that surround the capture pad. The lead lines are connected to an x-y register that is arranged to record the signature data and forward the data to a microprocessor. The customer writes his or her signature on the pad using a plastic stylus or a similar instrument having a point which is capable of forcing the conductive surface on the cover sheet at the contact point against the conductive coating upon the substrate thus electronically recording the signature.

Many customers using this type of terminal ignore the plastic stylus and elect instead to write on the capture pad with a writing instrument such as a ballpoint pen or a pencil, which causes rapid deterioration of the pad and eventual destruction of the pad. The pad will also deteriorate in time even when properly used, as the relatively thin cover sheet becomes worn.

Gannon et al. in U.S. Pat. No. 6,572,012 describes a cover assembly for the capture pad of a transaction terminal which protects the capture pad from dirt, dust, and the like.

The Gannon terminal includes a cover for protecting the signature capture pad which includes a first lower panel that contains an open frame that surrounds the capture pad and covers the electrical lead lines that run along the periphery of the capture pad. The lower panel is bonded by adhesive to the terminal housing. The cover further includes an upper cover panel that is placed over the lower cover panel and includes a frame and a protective plastic window that overlies the capture pad. The upper cover panel is removably secured to the lower panel by an adhesive so that the upper panel can be easily replaced if it becomes worn or otherwise damaged.

The Gannon terminal works very well in practice, however, the adhesive holding the upper panel in place can weaken in time and prematurely release the panel. Also, customers tend to tamper with the terminal and find ways to break the adhesive bond between the cover panels. In addition, replacing the upper cover panel can be relatively costly in that not only must the protective film be replaced, but also its frame with the adhesive bonding agent.

SUMMARY OF THE INVENTION

It is therefore an object of the present invention to improve point of sale transaction terminals that contain signature capture pads.

A further object of the invention is to better protect the signature capture pad of a transaction terminal.

A still further object of the present invention is to reduce the cost of replacing the protective cover of a point of sale transaction terminal.

Another object of the present invention is to render a point of sale transaction terminal tamperproof.

These and other objects of the present invention are attained by means of a point of sale transaction terminal that includes a signature capture pad having lead lines about its periphery and which is mounted in an upper surface of the terminal housing. A screen protector is mounted upon the upper surface to overlay the capture pad. In one embodiment, registration means are provided, such as registration pins, for registering the screen protector over the capture pad. A bezel closes over the periphery of the screen protector. A latch mounted within the terminal housing beneath the bezel engages the bezel when it is closed over the screen protector to secure the bezel to the terminal housing. The latch is released through a small access port in the terminal housing which provides restricted access to permit a pin or wire to be inserted into engagement with the latch to move the latch to a release position.

BRIEF DESCRIPTION OF THE DRAWINGS

For a better understanding of these and other objects of the present invention, reference will be made to the following detailed description of the invention which is to be read in association with the accompanying drawings, wherein:

FIG. 1 is an exploded view in perspective illustrating a point of sale transaction terminal embodying the teachings of the present invention;

FIG. 2 is a top view of the transaction terminal

FIGS. 3 and 4 are partial side elevations in section taken along lines 3—3 in FIG. 2 showing the latching mechanism of the invention in a latched and unlatched condition respectively.

DETAILED DESCRIPTION OF THE INVENTION

Turning now to the drawings, FIG. 1 illustrates a point of sale transaction terminal which is generally referenced 10. The terminal includes a housing 12 that contains electronic components for reading a debit or credit card and storing the card data and causing a sales slip to be generated. A vertically disposed slot 13 is found along one side of the housing through which the card is passed so that a reader that is mounted in the housing can read and forward the necessary data to a microprocessor to complete the transaction.

The housing includes an upper flat surface 15 that serves as a writing platen. A signature capture pad 19 is recessed into the platen so that the top surface of the pad is in coplanar alignment with the top surface of the platen and provides a convenient platform upon which a customer can sign his or her name. As set out in the above-mentioned Gannon et al. patent, the disclosure of which is included herein by reference, the capture pad is designed to electrically record the customer's signature and send the recorded data via suitable electrical leads to a register within the housing for processing. The electrical leads extend around the peripheral margin of the capture pad. The leads are at least partially exposed and thus subject to being damaged if the lines are penetrated by a writing stylus or the like. Exposing the lead lines to moisture can also be harmful.

As noted above, replaceable covers are known in the prior art for protecting the capture pad from undue wear and to prevent customers from writing directly upon the signature pad with a pen or pencil. These protective covers typically are mounted within a rigid frame, the frame in turn secured to the terminal housing by means of a weak adhesive that permits the frame from being stripped from the housing. To replace a worn protective screen, the residue adhesive on the housing must be removed and the entire screen assembly replaced.

As illustrated in FIGS. 1 and 2, the present invention employs a protective screen 20, also referred to as a screen protector, that is simply mounted upon the top surface of the platen 15 over the signature pad 19. The protective screen is simply a resilient strip of plastic that is slightly longer and wider than the capture pad so that it can overlay the entire surface area of the pad. A pair of raised registration pins 25 and 26 are mounted in the platen adjacent to the top and bottom edges of the capture pad. A pair of holes 29 and 31 are provided in the top and bottom margins of the protective screen that are arranged to slidably receive the registration pins therein and thus register the screen over the capture pad.

The capture pad and the protective screen are both contained within a shallow recess 30 in the top of the housing along with the platen 15. A bezel 40 is also contained within the recess. The bezel has an outer frame 42 that compliments the outer geometry of the recess and a rectangular-shaped central opening 43. A pair of tab-like hinges 45—45 are integrally joined to the top edge 46 of the bezel and are arranged to be slidably received within a pair of slotted openings 47—47 located in the top wall 48 of the recess 30. With the hinges in place, the frame of the bezel will close snuggly into the recess 30 with the opening 43 being centered upon the signature capture pad (see FIG. 3).

With further reference to FIGS. 3 and 4, a latch generally referenced 50 is mounted within a well 51 located in the front of the housing. The well is completely covered by the front section 53 (FIG. 2) of the bezel when the bezel is closed inside recess 30. The latch mechanism includes a generally vertical elongated member 54 that has a hook-like appendage 56 integrally joined to the top of the elongated member 54. The hook and elongated member are fabricated of a resilient plastic with the hook having an inclined upper surface 59 that allows the hook to automatically snap over an inwardly turned plate 58 located on the underside of the bezel at the front section 53 thereof when the bezel is brought to a closed position as shown in FIG. 3.

A hole 60 is passed through the front wall 61 of the terminal housing and the bracket 63 that supports the latch within the housing. The hole points directly at the rod portion of the latch with the axis of the hole passing through the rod. The hole has a diameter that makes it practically unnoticeable to the naked eye but large enough so that the straightened end of a paper clip or the like can be passed through the hole into contact with the elongated member portion of the latch. Accordingly, as illustrated in FIG. 4, the elongated member, which is resilient, can be pushed back sufficiently so that the latch will release the bezel which can then be removed to allow free and ready access to the protective screen when the screen needs replacing. A stop 64 is provided which limits the rearward travel of the latch to avoid overstressing of the elongated member. As should now be evident, the well hidden latch mechanism renders the interior of the terminal inaccessible and substantially tamperproof.

While this invention has been particularly shown and described with reference to the preferred embodiment in the drawings, it will be understood by one skilled in the art that various changes in its details may be effected therein without departing from the teachings of the invention.

What is claimed is:

1. A point of sale transaction terminal that includes:
   a terminal housing having an upper surface;
   a signature capture pad having electrical lead lines extending about the capture pad's periphery, the capture pad being mounted within a platen in the upper surface of the terminal housing;
   a screen protector for mounting over the capture pad;
   registration means for registering the screen protector over the capture pad;
   a bezel for mounting upon said platen, said bezel having an open center section and an outer frame that surrounds the outer periphery of the screen protector; and
   a substantially tamperproof latch mechanism including a latching means mounted within the terminal housing beneath said bezel for releasably securing said bezel against the upper surface; and
   an access port for providing restricted access to said latching means for unlatching said bezel.

2. The point of sale transaction terminal of claim 1, wherein the restricted access port is located in the terminal housing.

3. The point of sale transaction terminal of claim 1, wherein the capture pad has a top surface that is in co-planar alignment with a top surface of said platen.

4. The point of sale transaction terminal of claim 3, wherein said platen is disposed in a recess within the upper surface of the terminal housing.

5. The point of sale transaction terminal of claim 4 wherein said recess has sidewalls having a profile and the outer frame of said bezel has sidewalls having a profile that compliments the profile of said recess sidewalls whereby said bezel fits snuggly within the recess when the bezel is closed against said platen.

6. The point of sale transaction terminal of claim 4 wherein said bezel includes a pair of spaced apart tabs that are slidably received within a side wall of said recess.

7. The point of sale transaction terminal of claim 1, wherein said bezel further includes tab means for releasably attaching said bezel to the terminal housing.

8. The point of sale transaction terminal of claim 1, wherein said latching means includes an elongated-member fabricated of a resilient material, said elongated member having a hook-like appendage mounted upon an upper section thereof for releasably engaging said bezel when said bezel is in a closed position against said platen.

9. A point of sale transaction terminal comprising:
   a terminal housing having an upper surface;
   a signature capture pad having electrical lead lines extending about the capture pad's periphery, the capture pad mounted within the upper surface of the terminal housing;
   a screen protector mounted upon the upper surface to overlay the capture pad;
   a bezel mounted upon the upper surface, the bezel having an open center section centered over the capture pad and an outer frame that surrounds the outer periphery of the screen protector; and a substantially tamperproof latch mechanism including a latch mounted within the terminal housing beneath the bezel, said latch releasably securing the bezel to the terminal housing; and an access port associated with said latch, said access port providing restricted access to said latch for unlatching the bezel.

10. The point of sale transaction terminal of claim 9, wherein said restricted access port is located in the terminal housing.

11. A point of sale transaction terminal that includes:

a terminal housing having an upper surface;

a signature capture pad having electrical lead lines extending about the capture pad's periphery, the capture pad being mounted within a platen in the upper surface of the terminal housing;

a screen protector for mounting over the capture pad;

registration means for registering the screen protector over the capture pad;

a bezel for mounting upon said platen, said bezel having an open center section and an outer frame that surrounds the outer periphery of the screen protector;

a latching means mounted within the terminal housing beneath said bezel for releasably securing said bezel against the upper surface, said latching means including an elongated member fabricated of a resilient material, said elongated member having a hook-like appendage mounted upon an upper section thereof for releasably engaging said bezel when said bezel is in a closed position against said platen; and an access port for providing restricted access to said latching means for unlatching said bezel, said access port being a small diameter hole having a central axis that passes through the terminal housing whereby a wire may be passed through said hole into contact with said elongated member to force said elongated member back into an unlatching position.

12. The point of sale transaction terminal of claim 11, wherein the capture pad has a top surface that is in co-planar alignment with a top surface of said platen.

13. The point of sale transaction terminal of claim 12, wherein said platen is disposed in a recess within the upper surface of the terminal housing.

14. The point of sale transaction terminal of claim 13 wherein said recess has sidewalls having a profile and the outer frame of said bezel has sidewalls having a profile that compliments the profile of said recess sidewalls whereby said bezel fits snuggly within the recess when the bezel is closed against said platen.

15. The point of sale transaction terminal of claim 11, wherein said bezel further includes tab means for releasably attaching said bezel to the terminal housing.

16. The point of sale transaction terminal of claim 11, wherein said bezel includes a pair of spaced apart tabs that are slidably received within a side wall of said recess.

17. A point of sale transaction terminal that includes:

a terminal housing having an upper surface;

a signature capture pad having electrical lead lines, extending about the capture pad's periphery, the capture pad being mounted within a platen in the upper surface of the terminal housing;

a screen protector for mounting over the capture pad;

registration means for registering the screen protector over the capture pad;

a bezel for mounting upon said platen, said bezel having an open center section and an outer frame that surrounds the outer periphery of the screen protector;

a latching means mounted within the terminal housing beneath said bezel for releasably securing said bezel against the upper surface, said latching means including an elongated member fabricated of a resilient material, said elongated member having a hook-like appendage mounted upon an upper section thereof for releasably engaging said bezel when said bezel is in a closed position against said platen, said hook-like appendage having an incline surface for slidably engaging a plate on the inside of said bezel so that the latching will automatically latch the bezel when said bezel is closed against said platen; and an access port for providing restricted access to said latching means for unlatching said bezel.

18. The point of sale transaction terminal of claim 17, wherein the capture pad has a top surface that is in co-planar alignment with a top surface of said platen.

19. The point of sale transaction terminal of claim 18, wherein said platen is disposed in a recess within the upper surface of the terminal housing.

20. The point of sale transaction terminal of claim 19 wherein said recess has sidewalls having a profile and the outer frame of said bezel has sidewalls having a profile that compliments the profile of said recess sidewalls whereby said bezel fits snuggly within the recess when the bezel is closed against said platen.

21. The point of sale transaction terminal of claim 17, wherein said bezel further includes tab means for releasably attaching said bezel to the terminal housing.

22. The point of sale transaction terminal of claim 17, wherein said bezel includes a pair of spaced apart tabs that are slidably received within a side wall of said recess.

23. A point of sale transaction terminal that includes:

a terminal housing having an upper surface;

a signature capture pad having electrical lead lines extending about the capture pad's periphery, the capture pad being mounted within a platen in the upper surface of the terminal housing;

a screen protector for mounting over the capture pad;

registration means for registering the screen protector over the capture pad;

a bezel for mounting upon said platen, said bezel having an open center section and an outer frame that surrounds the outer periphery of the screen protector;

a latching means mounted within the terminal housing beneath said bezel for releasably securing said bezel against the upper surface, said latching means including an elongated member fabricated of a resilient material, said elongated member having a hook-like appendage mounted upon an upper section thereof for releasably engaging said bezel when said bezel is in a closed position against said platen;

an access port for providing restricted access to said latching means for unlatching said bezel; and a stop means for interrupting the travel of said elongated member when moved to an unlatched position whereby the elongated member is not overstressed.

24. The point of sale transaction terminal of claim 23, wherein said access port comprises a small diameter hole having a central axis that passes through the terminal housing whereby a wire may be passed through said hole into contact with said elongated member to force said elongated member back into an unlatching position.

25. The point of sale transaction terminal of claim 23, wherein the capture pad has a top surface that is in co-planar alignment with a top surface of said platen.

26. The point of sale transaction terminal of claim 25, wherein said platen is disposed in a recess within the upper surface of the terminal housing.

27. The point of sale transaction terminal of claim 26 wherein said recess has sidewalls having a profile and the outer frame of said bezel has sidewalls having a profile that compliments the profile of said recess sidewalls whereby said bezel fits snuggly within the recess when the bezel is closed against said platen.

28. The point of sale transaction terminal of claim 23, wherein said bezel further includes tab means for releasably attaching said bezel to the terminal housing.

29. The point of sale transaction terminal of claim 23, wherein said bezel includes a pair of spaced apart tabs that are slidably received within a side wall of said recess.

30. A point of sale transaction terminal comprising:
a terminal housing having an upper surface;
a signature capture pad having electrical lead lines extending about the capture pad's periphery, the capture pad mounted within the upper surface of the terminal housing;
a screen protector mounted upon the upper surface to overlay the capture pad;
a bezel mounted upon the upper surface, said bezel having an open center section and an outer frame that surrounds the outer periphery of the screen protector;
a latch mounted within the terminal housing beneath the bezel, said latch releasably securing the bezel to the terminal housing, said latch including an elongated member fabricated of a resilient material, said elongated member having a hook-like appendage mounted upon an upper section thereof for releasably engaging the bezel when the bezel is in a closed position against the upper surface; and
an access port associated with said latch, said access port providing restricted access to said latch for unlatching the bezel, said access port being a small diameter hole having a central axis that passes through the terminal housing whereby a wire may be passed through said hole into contact with said elongated member to force said elongated member back into an unlatching position.

31. The point of sale transaction terminal of claim 30, further comprising a stop operatively associated with said elongated member, said stop for interrupting the travel of said elongated member when moved to an unlatched position whereby the elongated member is not overstressed.

32. The point of sale transaction terminal of claim 30, wherein the capture pad has a top surface that is in co-planar alignment with a top surface of said platen.

33. The point of sale transaction terminal of claim 32, wherein said platen is disposed in a recess within the upper surface of the terminal housing.

34. The point of sale transaction terminal of claim 33 wherein said recess has sidewalls having a profile and the outer frame of said bezel has sidewalls having a profile that compliments the profile of said recess sidewalls whereby said bezel fits snuggly within the recess when the bezel is closed against said platen.

35. The point of sale transaction terminal of claim 30, wherein said bezel further includes tab means for releasably attaching said bezel to the terminal housing.

36. The point of sale transaction terminal of claim 30, wherein said bezel includes a pair of spaced apart tabs that are slidably received within a side wall of said recess.

37. A point of sale transaction terminal comprising:
a terminal housing having an upper surface and a platen within the upper surface;
a signature capture pad mounted within the platen;
a screen protector mounted upon the platen to overlay the capture pad;
registration means within the platen and in engagement with the screen protector for registering the screen protector over the capture pad;
a bezel mounted upon the upper surface, the bezel having an open center section centered over the capture pad and an outer frame that surrounds the outer periphery of the screen protector; and
a substantially tamperproof latch mechanism including a latch mounted within the terminal housing beneath the bezel, said latch releasably securing the bezel to the terminal housing; and
an access port associated with said latch, said access port providing restricted access to said latch for unlatching the bezel.

38. A point of sale transaction terminal comprising:
a terminal housing having an upper surface and a platen within the upper surface;
a signature capture pad mounted within the platen;
a screen protector mounted upon the platen to overlay the capture pad, the screen protector including a pair of holes therein;
a pair of registration pins mounted in the platen and in engagement with the pair of holes in the screen protector for registering the screen protector over the capture pad;
a bezel mounted upon the upper surface, the bezel having an open center section centered over the capture pad and an outer frame that surrounds the outer periphery of the screen protector;
a latch mounted within the terminal housing beneath the bezel, said latch releasably securing the bezel to the terminal housing; and
an access port associated with said latch, said access port providing restricted access to said latch for unlatching the bezel.

39. The point of sale transaction terminal of claim 38 wherein a first pin of said pair of pins is mounted in the platen adjacent a first edge of the capture pad and a second pin of said pair of pins are mounted in the platen adjacent a second edge of the capture pad.

40. The point of sale transaction terminal of claim 39 wherein said screen protector has a first hole in a first margin thereof adapted to receive said first pin and a second hole in a second margin thereof adapted to receive said second pin.

* * * * *

UNITED STATES PATENT AND TRADEMARK OFFICE
CERTIFICATE OF CORRECTION

PATENT NO.        : 7,172,114 B2                                      Page 1 of 1
APPLICATION NO.   : 11/027239
DATED             : February 6, 2007
INVENTOR(S)       : Donna M. Fletcher et al.

It is certified that error appears in the above-identified patent and that said Letters Patent is hereby corrected as shown below:

On the Title page:

Change Item 75 "Liverpool, NY" to -- Baldwinsville, NY --.

Change Item 73 "Skaneateles Fall, NY" to -- Skaneateles Falls, NY --.

Item 56 Insert the following U.S. patent document into References Cited U.S. Patent Documents -- 6,400,069 B1 6/2002, Espinosa--.

Change the following U.S. patent document listed in the References Cited U.S. Patent Documents from "5,672,850" to -- 5,672,860 --.

Item 56 Insert the following foreign patent document into the References Cited Foreign Patent Documents -- WO 96/26505, 8/1996 --.

Item 56  Insert the following non-patent literature into the References Cited Other Publications -- U.S. Application No. 10/414,385, filed April 15, 2003, Fitch et al.--.

In the Claims, change:

Column 4, Line 43.  Change the words "claim 4" to -- claim 1 --.

Column 4, Line 46.  Change the words "claim 1" to -- claim 4 --.

Column 5, Line 58.  Change the punctuation "lines," to -- lines --.

Signed and Sealed this

First Day of May, 2007

JON W. DUDAS
*Director of the United States Patent and Trademark Office*